United States Patent [19]

Shaw et al.

[11] Patent Number: 5,097,800

[45] Date of Patent: Mar. 24, 1992

[54] HIGH SPEED APPARATUS FOR FORMING CAPACITORS

[75] Inventors: David G. Shaw, Glens Falls; Angelo Yializis, South Glens Falls; Donald S. Strycker; Mooyoung Ham, both of Glens Falls, all of N.Y.

[73] Assignee: Spectrum Control, Inc., Erie, Pa.

[21] Appl. No.: 551,645

[22] Filed: Jul. 10, 1990

Related U.S. Application Data

[60] Continuation of Ser. No. 284,068, Dec. 13, 1988, abandoned, which is a division of Ser. No. 946,146, Dec. 22, 1986, abandoned, which is a continuation of Ser. No. 620,647, Jun. 14, 1984, abandoned, which is a continuation-in-part of Ser. No. 562,779, Dec. 19, 1983, abandoned.

[51] Int. Cl.$^5$ .............................................. C23C 16/44
[52] U.S. Cl. .................................. 118/730; 118/718; 118/719; 118/720; 118/724; 118/726; 427/35; 427/42; 427/44; 427/81; 427/251; 427/255.5; 427/255.6; 427/255.7
[58] Field of Search ...................... 118/50.1, 718, 719, 118/720, 730, 729, 724, 726; 427/35, 36, 44, 81, 251, 42, 50, 255.5, 255.6, 255.7

[56] References Cited

U.S. PATENT DOCUMENTS 1,873,548  8/1932  Cole ............................ 29/25.42 X (List continued on next page.)

FOREIGN PATENT DOCUMENTS

| 789746 | 7/1970 | Canada . |
| 2641232 | 3/1978 | Fed. Rep. of Germany . |
| 2737509 | 3/1979 | Fed. Rep. of Germany . |
| 2759118 | 7/1979 | Fed. Rep. of Germany . |
| 3231576 | 3/1984 | Fed. Rep. of Germany . |
| 55-27455 | 7/1980 | Japan . |
| 58-74701 | 5/1983 | Japan .................................. 427/44 |
| 59-177365 | 10/1984 | Japan . |
| 61-84367 | 4/1986 | Japan . |
| 8200542 | 2/1982 | PCT Int'l Appl. . |
| 550419 | 1/1943 | United Kingdom ................. 361/306 |
| 762953 | 12/1956 | United Kingdom . |
| 970865 | 1/1960 | United Kingdom . |
| 1104172 | 3/1966 | United Kingdom . |
| 1168641 | 10/1969 | United Kingdom . |
| 1253124 | 2/1970 | United Kingdom . |

OTHER PUBLICATIONS

Research Report BMFT-FB-T 83-049, "IC-Components with Monolithic Thin Layer Capacitors," sponsored by the Federal Ministry for Research and Technology, Apr. 1983, German docket and translation.
Bailey et al., "Thin-Film Multilayer Capacitors Using
(List continued on next page.)

Primary Examiner—Shrive Beck
Assistant Examiner—Terry J. Owens
Attorney, Agent, or Firm—Christie, Parker & Hale

[57] ABSTRACT

A high speed apparatus for forming capacitors includes a vacuum chamber in which is located a carrier defining a continuous surface configured to move at a rate of from about 150 feet per minute to about 600 feet per minute during the forming operation, a metal depositing device, a dielectric depositing device, and a radiation source. The metal depositing device is configured to deposit layers of metal onto the moving surface, and the dielectric depositing device includes (a) a device for atomizing a radiation-curable polyfunctional acrylic monomer to form liquid droplets of the monomer, (b) a heated surface on which the atomized monomer droplets impinge and are flash vaporized, and (c) device for thereafter condensing the flash-vaporized monomer on the metal layers to form a monomer coating on successive layers. The radiation source is positioned for curing successive monomer coatings after each such coating has been deposited, to thereby form a polymer dielectric layer. Apparatus are provided for controlling each of the devices so that metal is deposited, a monomer coating is deposited, and the monomer coating is cured to form the polymer dielectric layer before the continuous surface passes the devices again for successive metal layers, monomer coatings, and curings.

17 Claims, 9 Drawing Sheets

U.S. PATENT DOCUMENTS

| | | | |
|---|---|---|---|
| 2,389,420 | 11/1945 | Deyrup | 75/22 |
| 2,590,906 | 4/1952 | Tripp | 350/166 |
| 2,614,524 | 10/1952 | Haynes | 118/49 |
| 2,734,478 | 2/1956 | Reynolds et al. | 118/8 |
| 2,820,934 | 1/1958 | Mullikin | 361/308 |
| 3,024,394 | 3/1962 | Salisbury | 29/25.42 X |
| 3,068,510 | 12/1962 | Coleman | 204/168 |
| 3,081,201 | 3/1963 | Koller | 427/81 |
| 3,123,490 | 3/1964 | Bolomey et al. | 106/291 |
| 3,237,273 | 3/1966 | Gunter et al. | 29/25.42 |
| 3,244,953 | 4/1966 | Walsh et al. | 361/323 |
| 3,252,830 | 5/1966 | Cummin et al. | 361/323 X |
| 3,326,718 | 6/1967 | Dill | 29/25.42 X |
| 3,397,085 | 8/1968 | Cariou et al. | 427/81 |
| 3,457,614 | 7/1969 | Tibol | 29/25.42 |
| 3,466,719 | 9/1969 | Sharif et al. | 361/313 X |
| 3,518,111 | 6/1970 | Wright et al. | 428/220 |
| 3,520,987 | 7/1970 | Ohlrich | 174/117 |
| 3,547,683 | 12/1970 | Williams et al. | 427/36 |
| 3,617,834 | 11/1971 | Rayburn | 361/321 |
| 3,654,532 | 4/1972 | Rayburn | 361/323 X |
| 3,743,532 | 7/1973 | Wright et al. | 361/323 |
| 3,819,990 | 6/1974 | Hayashi et al. | 361/313 |
| 4,054,680 | 10/1977 | Sharbaugh et al. | 427/13 |
| 4,076,866 | 2/1978 | Platakis et al. | 573/240 |
| 4,121,537 | 10/1978 | Maruyama et al. | 118/7 |
| 4,153,925 | 5/1979 | Gazard et al. | 361/323 |
| 4,207,836 | 6/1980 | Nonaka | 118/664 |
| 4,261,798 | 4/1981 | Palmer | 203/9 |
| 4,277,516 | 7/1981 | Behn et al. | 427/81 |
| 4,290,384 | 9/1981 | Ausschnitt et al. | 118/722 |
| 4,301,580 | 11/1981 | Wallace | 29/25.42 |
| 4,301,765 | 11/1981 | Behn et al. | 118/718 |
| 4,329,419 | 5/1982 | Goff et al. | 430/283 |
| 4,356,608 | 11/1982 | Behn | 29/25.42 |
| 4,363,162 | 12/1982 | Price | 29/25.42 |
| 4,376,329 | 3/1983 | Behn et al. | 29/25.42 |
| 4,378,382 | 3/1983 | Behn | 427/9 |
| 4,379,182 | 4/1983 | Behn et al. | 427/41 |
| 4,387,113 | 6/1983 | Behn | 427/40 |
| 4,403,381 | 9/1983 | Almahmoud et al. | 29/25.42 |
| 4,414,722 | 11/1983 | Wehnelt | 29/25.42 |
| 4,434,452 | 2/1984 | Hamabe et al. | 361/304 |
| 4,453,199 | 6/1984 | Ritchie et al. | 361/306 |
| 4,490,774 | 12/1984 | Olson et al. | 361/311 |
| 4,502,095 | 2/1985 | Pachonik | 361/273 |
| 4,508,049 | 4/1985 | Behn et al. | 118/50.1 |
| 4,533,710 | 8/1985 | Olson et al. | 526/323.2 |
| 4,543,275 | 9/1985 | Akashi et al. | 527/250 |

OTHER PUBLICATIONS

Pyrolytically Deposited Silicon Dioxide," IEEE Transactions on Parts, Hybrids, and Packaging, vol. PHP-12, No. 4, Dec. 1976.

Robert W. Christy, "Formation of Thin Polymer Films by Electron Bombardment", Journal of Applied Physics, vol. 31, No. 9, Sep. 1960.

Haller et al., "Polymerization of Butadiene Gas on Surfaces Under Low Energy Electron Bombardment," vol. 67, Sep. 1963.

Peter White, "Preparation and Properties of Dielectric Layers Formed by Surface Irradiation Techniques," Insulation, May 1967.

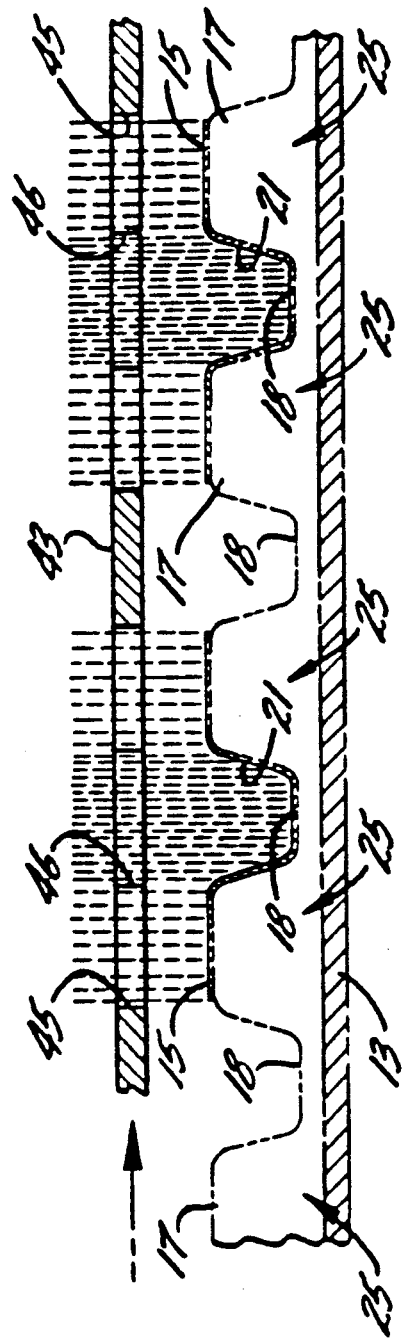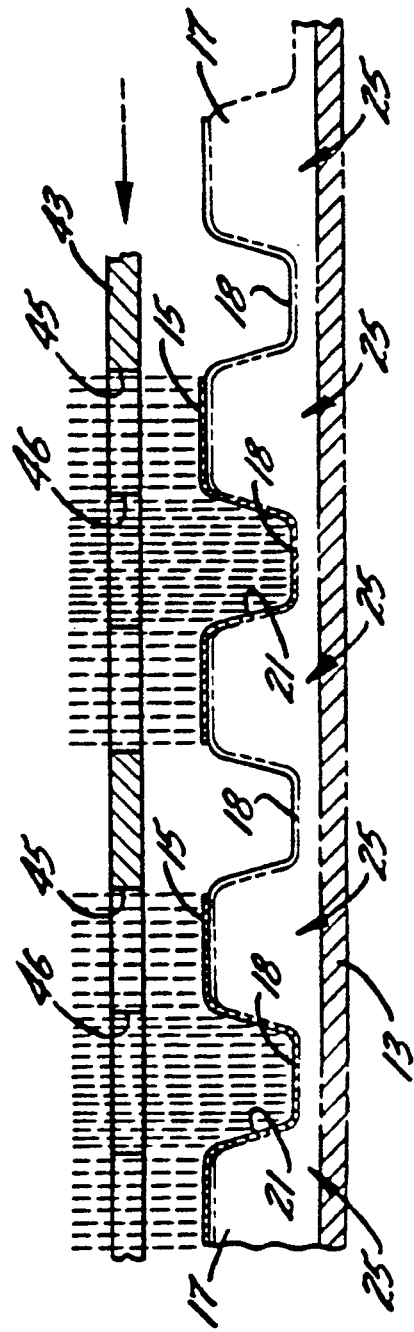

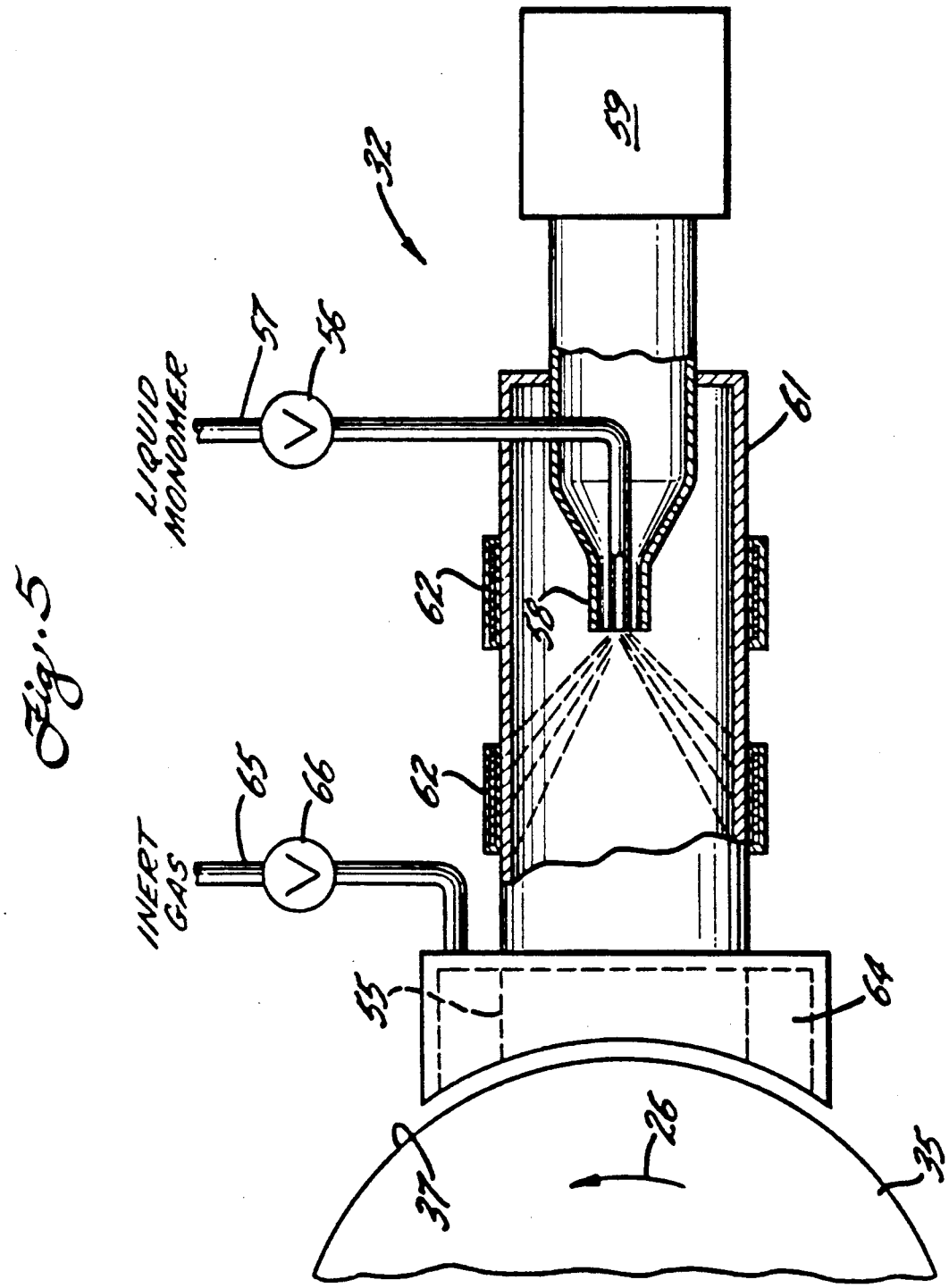

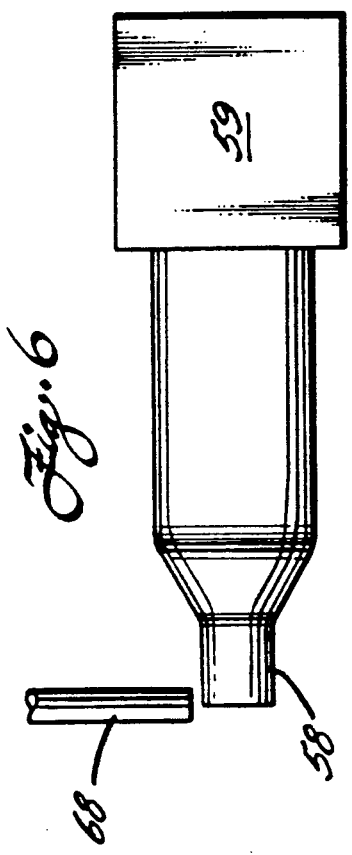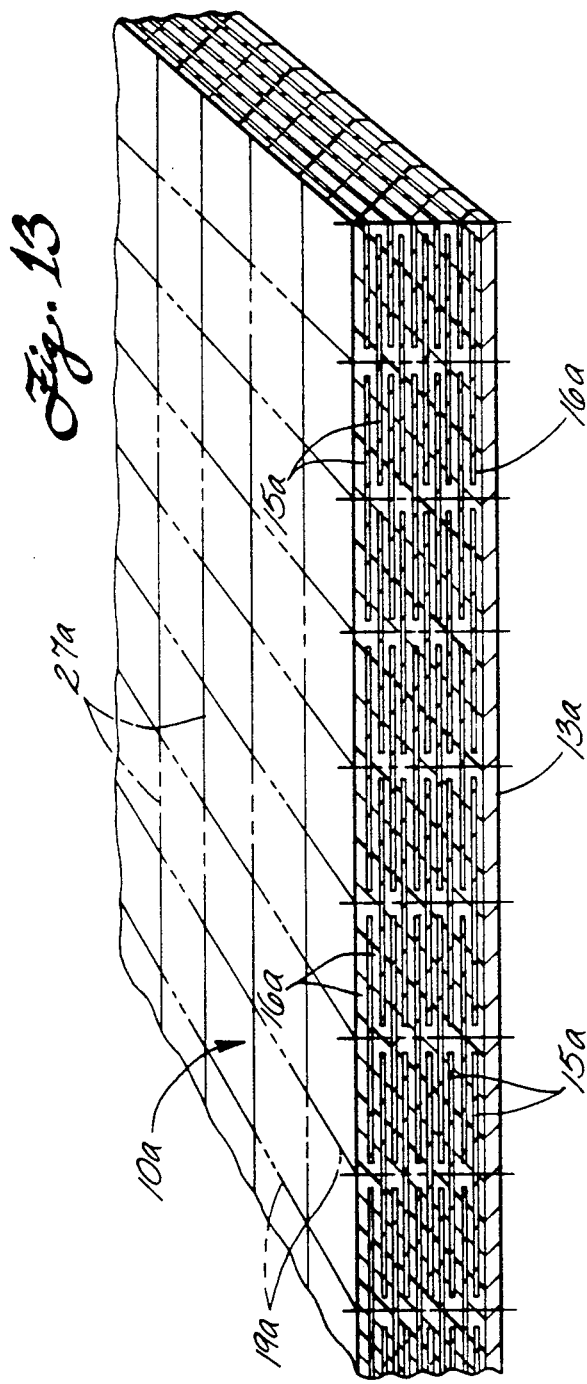

HIGH SPEED APPARATUS FOR FORMING CAPACITORS

CROSS REFERENCE TO RELATED APPLICATION

This application is a continuation of application Ser. No. 07/284,068 filed Dec. 13, 1988, abandoned, which is a division of application Ser. No. 946,146 filed Dec. 22, 1986, now abandoned, which is a continuation of application Ser. No. 620,647 filed June 14, 1984, now abandoned, which is a continuation-in-part of application Ser. No. 562,779, filed Dec. 19, 1983 under the same title, now abandoned.

FIELD OF THE INVENTION

This invention relates generally to electrical monolithic capacitors and more particularly concerns miniature multi-layered capacitors together with methods and apparatus for making them.

CROSS REFERENCES

This invention is related to the following co-pending, commonly assigned patents: U.S. Pat. No. 4,499,520, issued Feb. 12, 1985, entitled "Capacitor With Dielectric Comprising Poly-Functional Acrylate Polymer and Method of Making"; U.S. Pat. No. 4,490,774, issued Dec. 25, 1984, entitled "Capacitors Containing Polyfunctional Acrylate Polymers as Dielectrics"; U.S. Pat. No. 4,533,710, issued Aug. 6, 1985, entitled "1,2-Alkanediol Diacrylate Monomers and Polymers Thereof Useful as Capacitor Dielectrics"; U.S. Pat. No. 4,513,349, issued Apr. 23, 1985, entitled "Acrylate-Containing Mixed Ester Monomers and Polymers Thereof Useful as Capacitor Dielectrics"; and U.S. Pat. No. 4,515,931, issued May 7, 1985, entitled "Polyfunctional Acrylate Monomers and Polymers Thereof Useful as Capacitor Dielectrics," which are hereby incorporated by reference.

BACKGROUND AND OBJECTS OF THE INVENTION

A monolithic capacitor is one in which the layers of electrodes and dielectric are bonded together in a unitary structure as opposed for example, to a metallized film capacitor in which self-supporting films are rolled or wound into the capacitor form. A miniaturized capacitor is one of very small dimensions, so as to be suitable for microcircuitry. Small overall size could denote low capacitance of little practical value, except that the thickness of the intervening dielectric layer inversely affects the capacitance between adjacent electrodes, and the number of electrode pairs directly affects capacitance. Therefore, as a matter of basic capacitor theory, a capacitor having very thin dielectric layers and many pairs of electrodes could have substantial capacitance despite being of miniature size with the active area of the electrodes being quite small.

Modern microcircuitry not only is well suited for miniature capacitors, but a further requirement of such capacitor applications is an ability to withstand high temperatures. In an electronic circuit, a capacitor could be subject to sustained temperatures of up to 230° C. Even more demanding, circuit production techniques such as wave soldering could subject capacitors to temperatures beyond the melting point of solder, about 280° C., for as long as 10 to 30 seconds.

It is an object of the invention to provide an improved capacitor concept, including the capacitor architecture itself as well as the methods and apparatus for forming that architecture, that produces a very small, miniature capacitor which nevertheless has practical levels of capacitance.

A primary object is also to provide a concept of the foregoing kind that can very economically produce capacitors, both in the sense of using limited amounts of materials as well as permitting high volume, high speed capacitor manufacturing. A related object is to provide such a concept in which the electrical connections or leads can be easily and economically added to individual capacitors, and the capacitor encapsulated without difficulty.

Another object is to provide a concept as characterized above that results in a capacitor capable of withstanding substantial temperatures such as the 280° C. encountered during the process of wave soldering. A collateral object is to provide a concept of this kind that could readily be mounted on the bottom or foil side of a circuit board so as to permit compaction of the required physical size of a circuit using such capacitors.

It is also an object to provide a concept of the above character that is not polarity sensitive, i.e., the capacitor is reversible. An accompanying object is to provide such a concept in which the capacitor fails open, in other words, it is self-healing rather than being subject to shorting out in a circuit.

Other objects and advantages of the invention will become apparent upon reading the following detailed description and upon reference to the drawings, in which:

FIG. 1a is a perspective of a completed capacitor of the FIG. 1 type;

FIGS. 4a and 4b are cross sections of a portion of the apparatus shown in FIG. 2 illustrating alternate positions and the resulting modes of operation;

FIG. 5 is an enlarged, partially sectioned, diagram of a portion of the apparatus shown in FIG. 2;

FIG. 6 is an alternate apparatus to that shown in FIG. 5;

FIG. 13 is a perspective similar to FIG. 10 but showing an alternative capacitor group manufactured in a similar manner.

Figure 1:
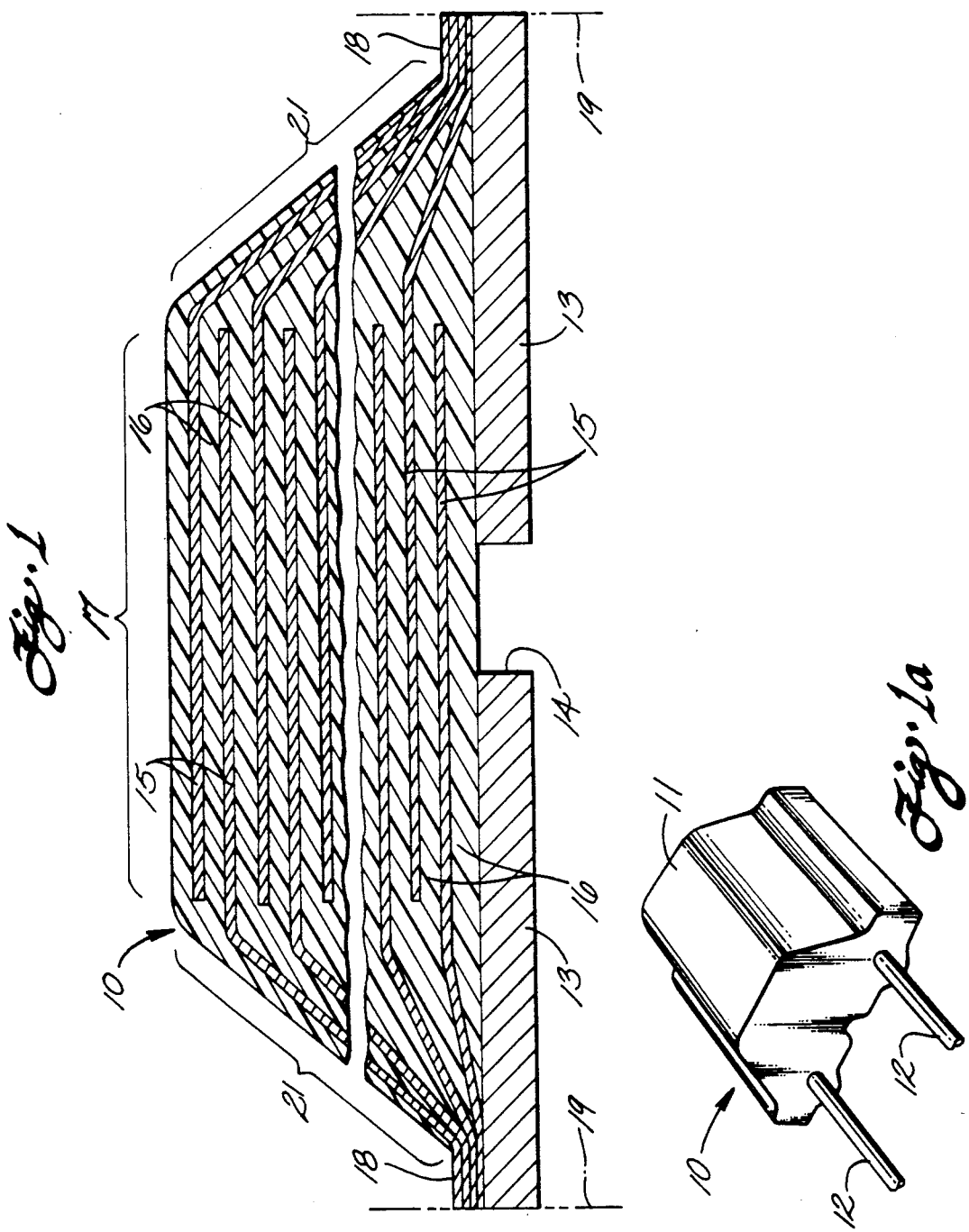
FIG. 1 is an enlarged cross section of a capacitor embodying one form of the invention before completion.

While the invention will be described in connection with preferred embodiments and procedures, it will be understood that we do not intend to limit the invention to those embodiments or procedures. On the contrary, we intend to cover all alternatives, modifications and equivalents as may be included within the spirit and scope of the invention as defined by the appended claims. Turning to the drawings, there is shown in FIGS. 1 and 1A a capacitor 10 embodying the inventive concept including an encapsulated body 11 with extending connecting wire leads 12. The FIG. 1 cross section, showing a conductive substrate 13 notched at 14 into separate pieces, conductive layers 15, and dielectric coatings 16, illustrate the capacitor 10 before the leads 12 are connected to the respective pieces of the substrate 13 and the capacitor is encapsulated.

Preferably, the substrate 13 is copper sheet about 1.5-2 mils thick. The conductive layers 15 are electrode material such as aluminum about 200-500 Angstroms thick, and the dielectric coatings 16, about 1 micron thick in the center region, are cured, i.e., cross linked, radiation curable resin capable of adhering or bonding to the electrode material and substrate. Useful resins are polyfunctional acrylics, and mixtures thereof, disclosed in the patents cross referenced above.

As will be apparent from the dimensions given, even a miniature capacitor of this design which is less than 1 inch square in outer periphery and a few millimeters thick can embody many alternate electrode and dielectric layers, up to 1000 or more. The result is a capacitor effective at up to 50 volts with a capacitance in the 0.001 to 100 microfarad range, depending, of course, upon overall size and the number of electrode pairs.

The dielectric coatings 16 space and separate the conductive layers 15 which are, in effect, divided into two offset sets that extend into a capacitance section or region 17 in which the layers are uniformly interleaved in stacked electrically isolated relation.

Pursuant to the invention, there are terminal portions 18 on the substrate 13 defining electrical joining sections ending at cut-off lines 19 spaced substantially from the opposite, and separated, edges of the central capacitance region 17. The coatings 16 taper from uniform thickness in the uniform capacitor region 17 to zero thickness adjacent the terminal portions 18, so that the capacitor has sloped portions 21. The spacing of the cut-off lines 19 and the terminal portions 18 from the central capacitance region 17 is sufficient so that the uppermost coating 16 in a given capacitor has a horizontal dimension, horizontal being the plane of the substrate 13, that permits the acceptance of a final conductive layer 15 in the sloped portions 21. That is, assuming the electrode material will be vapor deposited virtually perpendicular to the substrate 13, and that the layers 15 in the sloped portions 21 will be steeper and steeper with respect to the substrate as additional layers are built up, the initial capacitor region-cut-off line spacing must be great enough so that the final electrode layer 15 is not required to be vertical to the substrate. In practice, when working with coatings and layers having the thicknesses indicated, it is desirable to space the terminal portions 18 at least 10 microns from the central capacitance region 17, or else control of the coatings and layers 15, 16 in the sloped portions 21 becomes difficult and the resulting structure build-up unreliable.

It can now be seen that the purpose of the notch 14 is to divide the substrate 13 and thus eliminate electrical connection between the two terminal portions 18.

Figure 10:
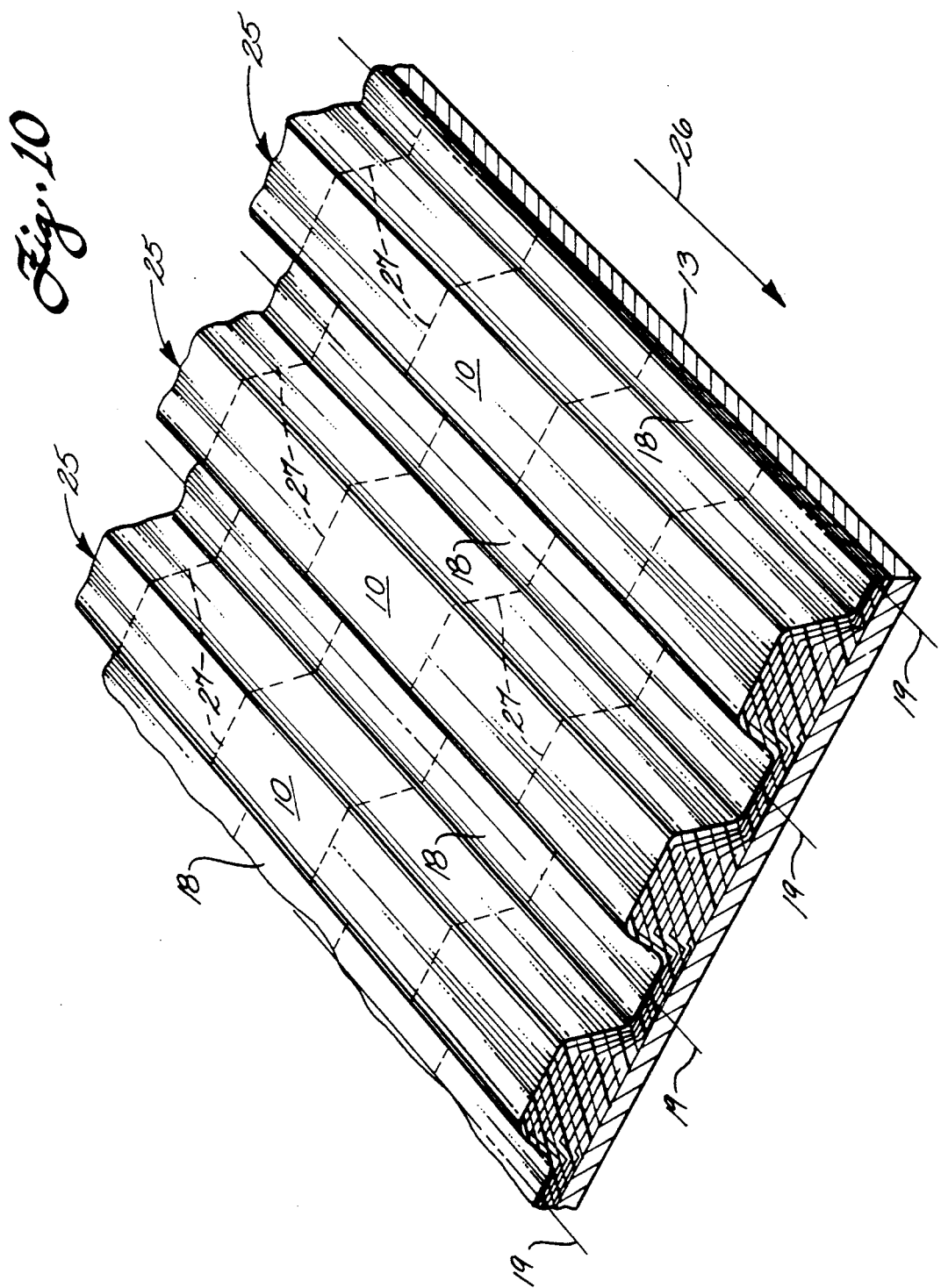
FIG. 10 is a fragmentary perspective of a group of the FIG. 1 capacitors in the form in which they are manufactured.
Figure 11:
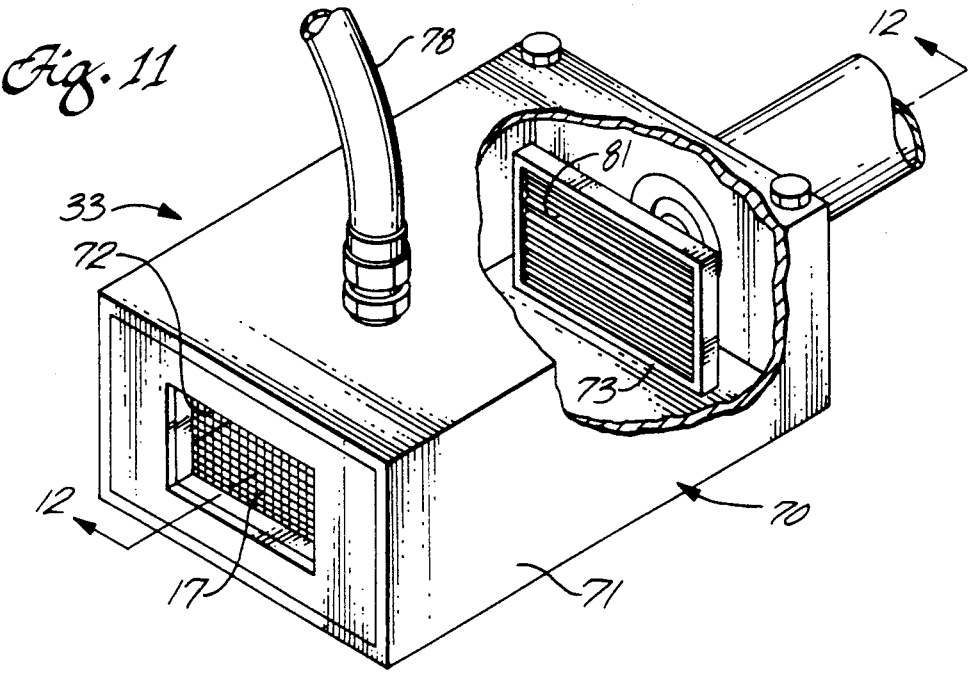
FIG. 11 is a fragmentary perspective, partially sectioned, of a portion of the apparatus shown in FIG. 2.
Figure 12:
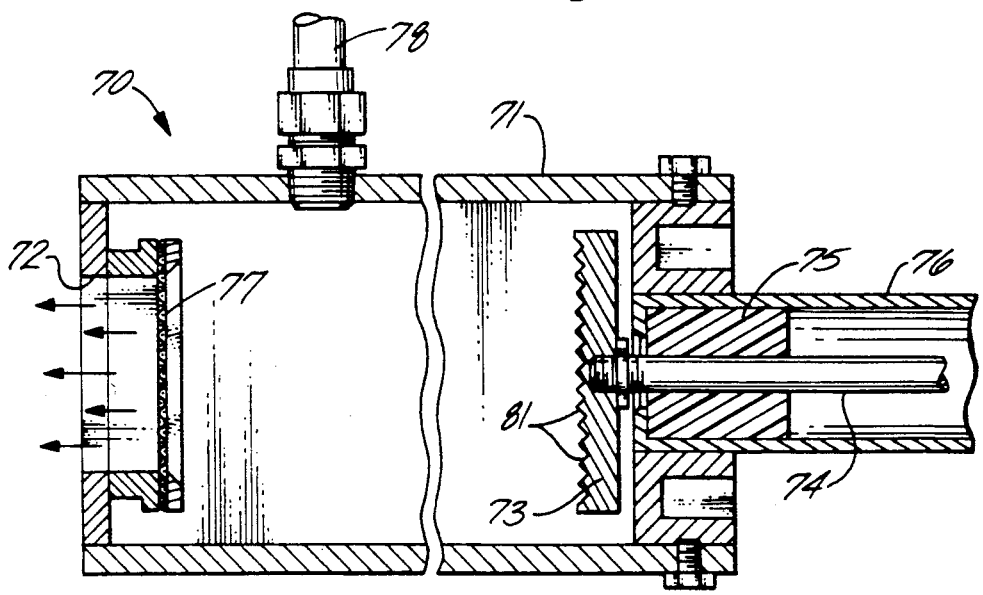
FIG. 12 is a section taken approximately along the line 12—12 in FIG. 11.

In carrying out an embodiment of the invention, capacitors like the capacitor 10 are simultaneously formed in large numbers by depositing electrode material and dielectric in strips on the substrate 13 which rapidly moves relative to the depositing systems. The layers 15 and coatings 16 are built up in the number desired by causing successive passes to be made relative to the depositing systems. The result, see FIG. 10, is a series of lanes 25 which can be separated along the cut-off lines 19 running in the machine direction 26, a term that will be made evident below, and divided into individual capacitors 10 along cross cut lines 27 spaced in accordance with the nominal capacitance desired. The greater the spacing, the more electrode area each layer 15 will have in the capacitor region 17 of the individual capacitor 10 and the higher will be the resulting capacitance.

From the lane configuration, capacitors 10 are thus cut to desired size, the notch 14 is formed, the leads 12 are added, and the device encapsulated.

It can be seen from FIG. 1 that the dielectric coatings 16 can be built up by depositing a coating strip at the same relative position of the substrate 13 after each strip of electrode material has been deposited. To create the interleaved sets of electrode layers 15, in one depositing pass electrode material is deposited in every other terminal portion 18 and the adjacent capacitor regions 17, and in the next pass, after an intervening dielectric coating, electrode material is deposited in the terminal portions 18 not previously receiving material and in each adjacent capacitor region 17 (see FIGS. 4A and 4B).

Figure 2:
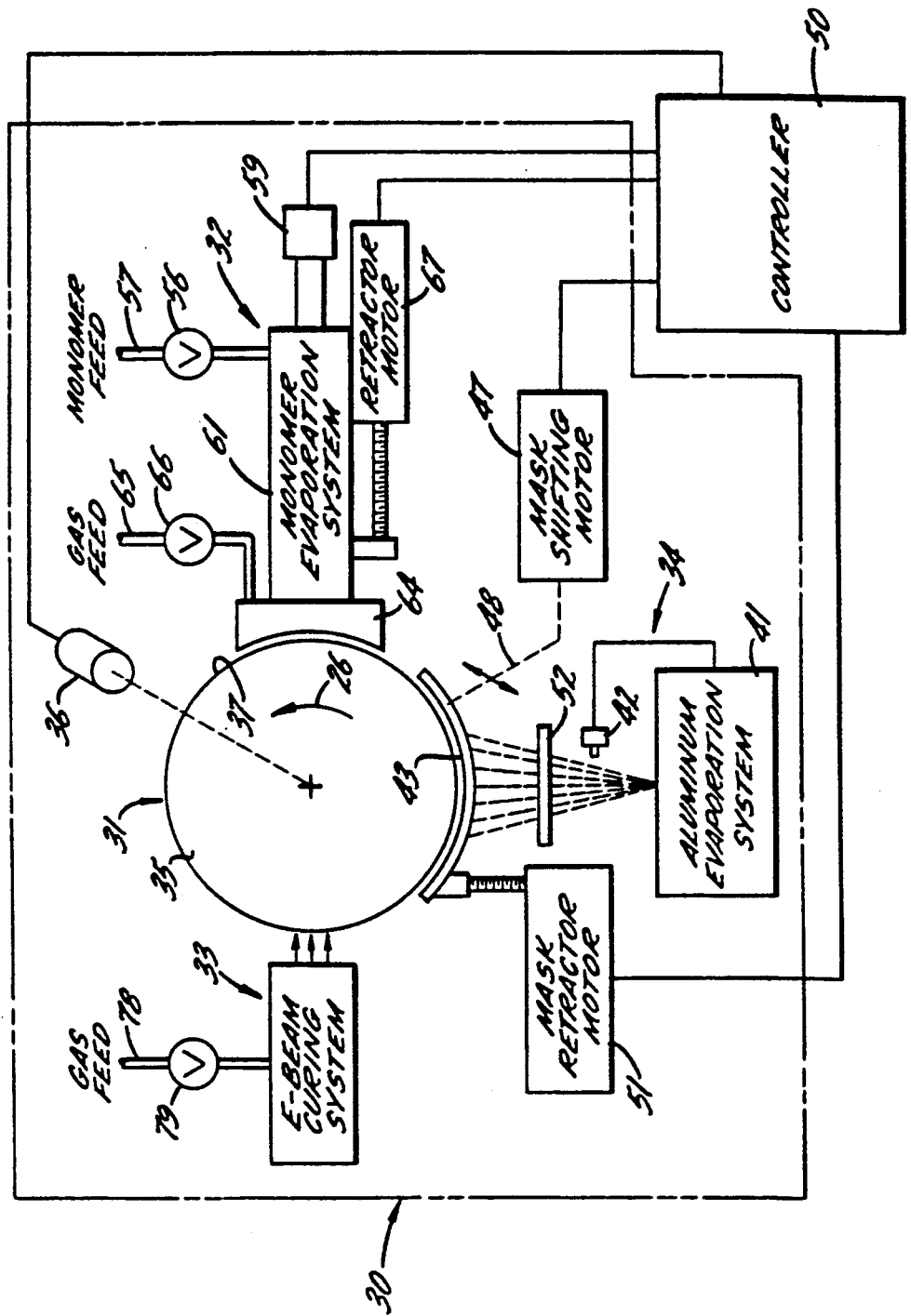
FIG. 2 is a schematic of an apparatus embodying one form of the invention.
Figure 3:
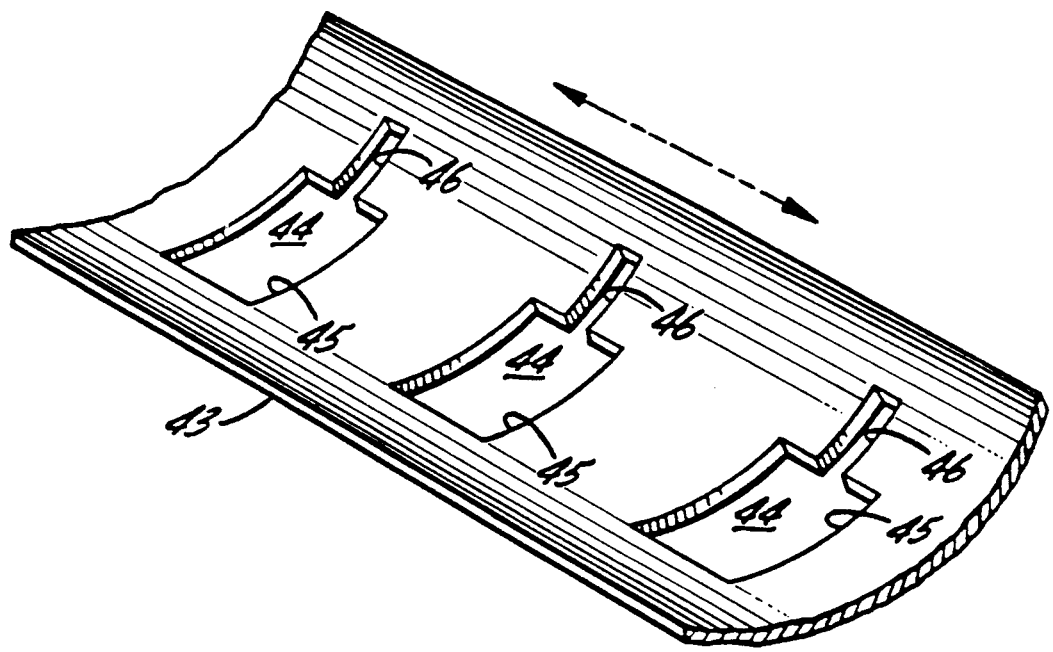
FIG. 3 is a fragmentary perspective of a portion of the apparatus shown in FIG. 2.
Figure 7:
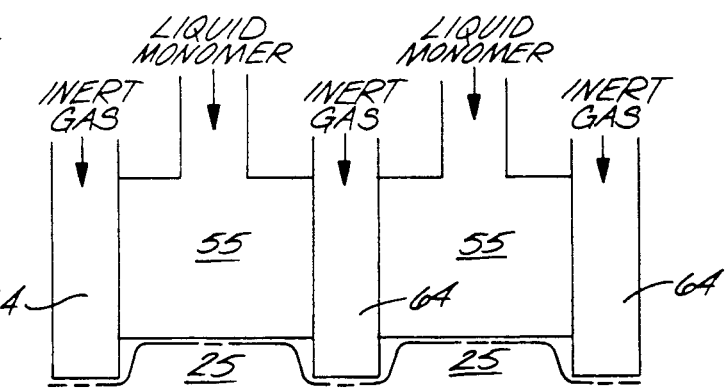
FIG. 7 is a fragmentary diagram of a portion of the apparatus shown in FIG. 2.
Figure 8:
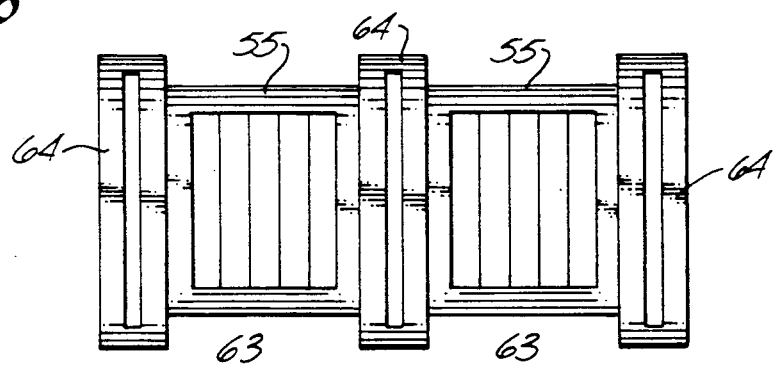
FIG. 8 is a bottom elevation of the apparatus shown in FIG. 7.
Figure 9:
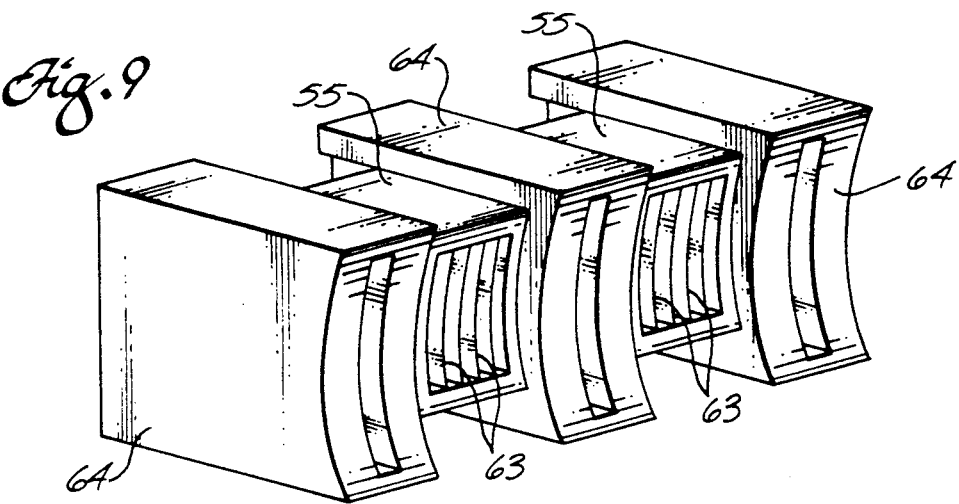
FIG. 9 is a perspective of the apparatus shown in FIG. 8.

The inventive capacitor concept, in a preferred form, includes apparatus arranged within and around a chamber 30 (see FIG. 2) which is either a vacuum chamber or a housing divided into vacuum portions. Within a vacuum environment is a carrier 31, a dielectric deposit system 32, a monomer curing system 33, and an electrode material deposit system 34. A substantial vacuum is required down to the order of $1 \times 10^{-4}$ Torr.

The carrier 31 is a water cooled drum 35 driven by a motor 36 and whose outer cylindrical surface 37 defines a rapidly moving continuous surface passing through a dielectric forming zone and an electrode forming zone. The regions in which the drum surface 37 and the systems 32, 33 are located constitute the dielectric forming zone, and the region in which the drum surface 37 and the system 34 are located constitute an electrode forming zone. Drum rotation creates the machine direction 26, which is the direction the surface passes through the dielectric forming zone and the electrode forming zone.

Because of the small dimensions involved, the surface 37 should be smooth and true. The sheet of substrate 13 is firmly secured to the drum 35 and, when in place, the outer surface of the substrate defines the surface 37. The drum 35 is cooled to about 70° F. so as to facilitate condensation of the vapor deposits, and the apparatus functions at drum surface speeds of 150 to 600 feet per minute.

The electrode material deposit system 34 includes a conventional electron beam vaporization device 41 such as those used for metallizing film within a vacuum environment. The rate of vaporization is sensed by a conventional quartz monitoring device 42 providing feedback for controlling the rate at which aluminum is vaporized by the device 41.

The pattern in which aluminum vapor is deposited is controlled by a mask, in this case a shadow mask 43, having openings 44 through which the vapor passes. The openings 44 have a main portion 45 wide enough to span the capacitance regions 17 in two adjacent lanes 25 as well as the intermediate terminal portions 18. As the capacitors are built up, the sloped portions 21 become greater in surface area and more aluminum is required to lay down an integral layer capable of carrying current. This is achieved by forming the mask openings 44 with an extension 46 spanning adjacent sloped portions 21 and the intervening terminal portions 18. The amount of electrode material deposited is a function of the time the receiving surface is beneath an open portion of the mask 43, and thus more metal is placed on the sloped portions 21 than in the capacitance regions 17.

The alternate pattern of metal vapor deposition discussed above in connection with FIGS. 4a and 4b is obtained by shifting the mask 43 axially of the drum 35 upon each drum revolution. A mask motor 47 makes the shifting movement through a simple mechanical connection 48. A controller 50 is connected to the drum motor 36 for sensing drum revolution, and the controller 50 supplies the appropriate shifting signal to the mask shifting motor 47. It is desirable to keep the mask 43 close to the surface onto which the metal vapor is being deposited, and this closeness is maintained by a mask retraction motor 51 which steps the mask away from the surface 37 upon each drum revolution, as signalled by the controller 50, through a distance approximating the thickness of the electrode layer being deposited.

As it is convenient to energize the device 41 and bring it into stable operating condition before beginning to make capacitors, a removable shutter 52 is interposed between the device 41 and the mask 43 for closing off the passage of vapor until the shutter 52 is withdrawn.

As a feature of the invention, the dielectric deposit system 32 flash vaporizes the dielectric in monomer form, and the smaller gaseous molecules are guided under moderate differential pressure through nozzles 55 onto the capacitor lanes 25. The monomer in liquid form is fed through a line 56 and control valve 57 to the open end of the horn 58 of an ultrasonic atomizer 59. The resulting tiny liquid droplets impinge on the inner walls of a vaporization tube 61 heated by band heaters 62 to an appropriate temperature, approximately 350° C. for the acrylate resins referred to above. The liquid is thus instantaneously vaporized, i.e., flash vaporized, so as to minimize the opportunity for polymerization. The resulting smaller gas molecules tend to follow a straighter path for better control of the deposition.

Pressure in the tube 61, at about 1 Torr, causes a monomer gas stream to flow through the nozzles 55 for deposition and condensation. The nozzles 55 are heated by conduction from the tube 61 to minimize condensation before the gas stream leaves the nozzles.

The deposition is confined, and the tapered edge shape of the coatings 16 obtained, by restricting the monomer gas flow by using guiding deflectors 63 in the nozzles 55, placing the nozzles 55 quite close to the condensing surface of the lanes 25, and providing inert gas edge barrier walls delivered through sets of nozzles 64 on either side of the monomer nozzles 55. Inert gas is supplied to the nozzles 64 through a line 65 and a control valve 66, and the nozzles 64 are fixed relative to the surface 37 with about a 4 mil clearance spacing, sufficient to clear the expected build-up of the terminal portions 18. The monomer gas nozzles 55 are stepped back by a retraction motor 67, signalled by the controller 50, upon each revolution of the drum by an amount approximating the thickness of a coating 16.

The thickness of the coating 16 is dependent upon the time of deposit, i.e., the length of the nozzles 55 relative to the speed of the surface 37, and the rate of monomer flow through the valve 57. By balancing the inert gas flow using the valve 66 against the monomer gas flow, the tapered side of the dielectric coating strips can be controlled.

An alternate arrangement for atomizing the liquid monomer is suggested in FIG. 6 wherein the monomer is directed through a capillary tube 68 to a point closely adjacent the horn 58 of the ultrasonic atomizer 59. In this arrangement, a meniscus is formed between the end of the capillary tube 68 and the end of the horn 58, and the monomer is drawn uniformly through the tube.

The condensed liquid monomer is radiation cured by the second system 33 in the dielectric forming zone which includes a radiation source, preferably a gas discharge electron beam gun 70. The gun 70 directs a flow of electrons from a housing chamber 71 through an emitter window 72 onto the monomer, thereby curing the material to a polymerized cross linked form capable of withstanding the high temperatures to which the capacitor 10 might be subject. The cured material is also bonded in place.

The gun 70 includes a rectangular copper cathode 73 supported by a connector 74 in an insulator 75 mounted in a ground shield 76 that is fixed to the housing 71. A tungsten mesh extraction screen 77 is fixed across the window 72. A gas such as argon is fed to the housing chamber 71 through a line 78 and a control valve 79. An electrical potential is imposed between the cathode 73 and its connector 74, and the shield 76, housing 71 and screen 77, with the result, keeping in mind the vacuum environment, that a gaseous plasma is created in the housing, primarily between the cathode 73 and the screen 77. The cathode is preferably formed with grooves 81 on its face so that electrons are expelled in a non-linear beam to substantially fill the housing chamber 71. Because of the plasma created, other electrons are stripped from the ionized gas molecules in different portions of the chamber, a so-called field enhanced effect, with the result that electrons at widely varying energy levels are emitted from the window 72. The wide range of energy levels of the emitted electrons is believed to cause the observed effect that the monomer is cured with little surface charging, and avoiding surface charging on the coatings 16 minimizes the possibility of arcing to the electrode layers. It can also be seen that the gun 70 produces a wide beam of electrons so that a number of capacitor lanes can be simultaneously treated.

The overall operation of the apparatus can now be readily understood. Electrode layers are deposited, coated with dielectric and the dielectric cured, before the surface on which the electrode layers are deposited passes again for successive electrode layers and dielectric coatings. Desired thicknesses of the electrode layers and dielectric coatings are determined by matching the rate of vapor deposition with the surface speed of the drum 35.

It will be apparent that the capacitors 10 are truly miniature capacitors having, nevertheless, useful levels of capacitance. Those familiar with the art will understand that the apparatus and methods disclosed economically produce the capacitors 10 in the sense that high speed production is possible of large numbers of capacitors simultaneously, as well as in the sense that each individual capacitor uses little raw material. Despite the small size of each capacitor, there is, in the design of that capacitor, a usable workable area for securing wire leads so as to complete the assembly. Since the capacitor is made up solely of metal and cured temperature resisting resin, they are capable of withstanding substantial temperatures including those temperatures for a limited time resulting from wave soldering assembly techniques.

As a result of the very small dimensions involved in the thicknesses of the electrode layers and dielectric coatings, the capacitor 10 has the property of being self-healing. That is, should a defect exist in a dielectric coating permitting a small amount of metal to electrically connect electrode layers in the opposite sets, the application of current could be expected to burn or melt the very small cross section of connecting metal so as to open the defect. As a result, it is highly unlikely that the capacitor will fail by shorting out.

The apparatus and methods described above can also be advantageously employed to form capacitors in a full width configuration as opposed to the lane configuration of FIG. 10. As shown in FIG. 13, where elements similar to those already described have been given the corresponding reference numeral with the distinguishing suffix a added, capacitors 10a can be formed on a substrate 13a having both the conductive layers 15a and the dielectric coatings 16a of uniform thickness. Separating individual capacitors 10a along cut-off lines 19a and cross cut lines 27a exposes the edges of the conductive layers 15a and therefore some form of edge termination is required to electrically connect the interleaved layers 15a at the opposite ends of the capacitor.

It will be appreciated that this form of capacitor 10a can be formed by eliminating the inert gas nozzles 64 and uniformly depositing the monomer through the system 32. Because the conductive layers 15a are not sloped, there is also no need for the extension 46 in the shadow mask 43 of the system 34. Otherwise, the capacitors 10a can be made in full width configuration consistent with the width of the systems 32, 33 and 34.

It will be understood that the foregoing description is only of certain preferred embodiments, and the invention is to be determined by giving the following claims their proper scope and interpretation.

We claim as our invention:

1. A high-speed apparatus for forming capacitors comprising a vacuum chamber, a carrier in the vacuum chamber defining a continuous surface configured to move at a rate of from about 150 feed per minute to about 600 feed per minute during the forming operation, a metal depositing device in the vacuum chamber for depositing layers of metal on the moving surface, a dielectric depositing device in the vacuum chamber, the dielectric depositing device including (a) means for atomizing a radiation-curable polyfunctional acrylic monomer to form liquid droplets of said monomer, (b) a heated surface on which the atomized monomer droplets impinge and are flash vaporized, and (c) means for thereafter condensing the flash-vaporized monomer on the metal layers to thereby form a monomer coating on each successive metal layer, a radiation source in the vacuum chamber positioned for curing successive monomer coatings after each such coating has been deposited to thereby form a polymer dielectric layer, and means for controlling each of the devices so that metal is deposited, a monomer coating is deposited, and the monomer coating is cured to form the polymer dielectric layer before the moving surface passes the devices again for successive metal layers, monomer coatings and curings.

2. The apparatus of claim 1 in which the carrier is a drum, the metal depositing device evaporates electrode metal, and the radiation source is a gas discharge electron beam gun.

3. An apparatus according to claim 1 additionally comprising means for controlling the temperature of the moving surface.

4. An apparatus according to claim 2 additionally comprising means for cooling the drum so that the drum surface is cooled to a temperature sufficient to facilitate condensation of the flash vaporized monomer.

5. An apparatus according to claim 2 wherein the moving surface is a sheet secured to the drum.

6. An apparatus according to claim 2 wherein the moving surface is about 1.5 to 5 mils thick.

7. An apparatus according to claim 5 wherein the sheet is a copper sheet.

8. An apparatus according to claim 1 wherein said heater surface comprises a heated tube.

9. An apparatus for continuously producing, under vacuum, a monolithic multi-layer capacitor on a substrate surface, the apparatus comprising means for forming a layer of electrode material on a surface within at least one predefined electrode forming zone, means for forming a coating of dielectric material on a surface within at least one predefined dielectric forming zone with the dielectric material being bondable with the with the dielectric material being bondable with the electrode material, the dielectric-forming means comprising (a) a deposition device comprising (1) means for atomizing a radiation-curable polyfunctional acrylic monomer to form liquid droplets of said monomer, (2) a heated surface on which the atomized monomer droplets impinge and are flash vaporized, and (3) means for thereafter condensing the flash-vaporized monomer on the electrode material to form a monomer coating and (b) a radiation source positioned for curing the monomer coating after it has been fully deposited to thereby form the dielectric coating, and means for passing the substrate surface carrying the electrode material layers and the dielectric coatings at a rate of from about 150 feet per minute to about 600 feet per minute repeatedly through the electrode and dielectric forming zones in sequence so that different positions of the moving surface are simultaneously within their respective zones so as to produce alternate layers of electrode material and dielectric coating one on top of the other on the substrate surface.

10. The apparatus of claim 9 including means for controlling the rates of forming the electrode layers and the dielectric coatings so as to predetermine the thickness of the alternate layers of electrode material and dielectric coatings.

11. The apparatus of claim 9 in which said means for forming a layer of electrode material includes means for evaporating metal electrode material and a mask for confining the evaporated metal electrode material to the electrode forming zone.

12. The apparatus of claim 11 including means for stepping said mask away from said substrate surface after each repeated pass so as to maintain said mask at substantially the same distance from said coatings during each such pass.

13. An apparatus according to claim 9 additionally comprising means for controlling the temperature of the substrate surface.

14. An apparatus for producing a capacitor under vacuum on a substrate comprising means for forming a layer of electrode material of predetermined thickness on a surface within at least one predefined electrode forming zone, means for forming a coating of radiation-curable material comprising a polyfunctional acrylic monomer of predetermined thickness on a surface within at least one predefined dielectric forming zone, said coating means comprising (a) means for atomizing the polyfunctional acrylic monomer to form liquid droplets of said monomer, (b) a heated surface on which the atomized droplets impinge and are flashed vaporized, and (c) means for thereafter condensing the flash-vaporized monomer on the electrode layer, a radiation source for curing the completed dielectric monomer coating within the dielectric forming zone to thereby form a cured polymer dielectric coating, means for moving the substrate surface at a rate of from about 150 feet per minute to about 600 feet per minute alternately into the electrode forming zone and the dielectric forming zone, and means for controlling the electrode layer forming means, the monomer coating forming means, the curing means and the moving means so as to produce alternate layers of electrode material and cured dielectric coating.

15. The apparatus of claim 14 in which the radiation source is a gas discharge electron beam gun.

16. An apparatus according to claim 14 additionally comprising means for controlling the temperature of the substrate surface.

17. An apparatus for forming multi-layered capacitors comprising:
(a) a vacuum chamber containing: i) a movable surface; ii) a vaporizer comprising an inlet portion, means for atomizing a radiation curable polyfunctional acrylic monomer to form liquid droplets of said monomer, a heated surface on which the atomized droplets impinge and are flash vaporized, and a vapor outlet, the vapor outlet mounted adjacent an upstream portion of the movable surface; iii) curing means comprising a radiation source mounted adjacent a downstream portion of the movable surface; iv) means for maintaining the movable surface at a temperature below that of the vaporizer; and v) means for depositing conductive metal layer on the movable surface;
(b) means for evacuating gas from the vacuum chamber to a pressure of less than about $1 \times 10^{-4}$ Torr;
(c) means for metering a quantity of said radiation-curable a polyfunctional acrylic monomer into the inlet portion of the vaporizer;
(d) means for moving the movable surface relative to the vapor outlet and the curing means at a rate of from about 150 feet per minute to about 600 feet per minute;
(e) means for condensing vaporized monomer dispensed form the vapor outlet onto the moving surface to thereby form a liquid monomer coating on the moving surface;
(f) means for activating the radiation source to thereby cure the liquid monomer coating that has formed on the moving surface to thereby form a radiation-cured polymer dielectric layer on the moving surface; and
(g) means for depositing a conductive layer of metal onto the cured polymer dielectric layer.

* * * * *

UNITED STATES PATENT AND TRADEMARK OFFICE
CERTIFICATE OF CORRECTION

PATENT NO. : 5,097,800
DATED : March 24, 1992
INVENTOR(S) : David W. Shaw, et al.

It is certified that error appears in the above-identified patent and that said Letters Patent is hereby corrected as shown below:

Column 3, line 34, after "layers" insert -- 15 --;

Column 7, line 23, after "suffix" change "a" to -- a --;

Column 7, lines 47, 48, change "feed" to -- feet -- (both occurrences);

Column 8, lines 27, 28, after "bondable " on line 7, delete "with the with the dielectric material being bondable";

Column 10, line 11, change "layer" to -- layers --;

Column 10, line 22, change "form" to -- from --.

Signed and Sealed this

Sixth Day of July, 1993

MICHAEL K. KIRK

Attest:

Attesting Officer

Acting Commissioner of Patents and Trademarks